US007688196B2

(12) United States Patent
Hannah

(10) Patent No.: US 7,688,196 B2
(45) Date of Patent: Mar. 30, 2010

(54) INTRINSICALLY SAFE COMMUNICATION AND TRACKING SYSTEM

(76) Inventor: Dewayne Newell Hannah, P.O. Box 2058, Elkins, WV (US) 26241

( * ) Notice: Subject to any disclaimer, the term of this patent is extended or adjusted under 35 U.S.C. 154(b) by 430 days.

(21) Appl. No.: 11/642,037

(22) Filed: Dec. 19, 2006

(65) Prior Publication Data

US 2008/0143513 A1   Jun. 19, 2008

(51) Int. Cl.
*G08B 1/08* (2006.01)
(52) U.S. Cl. .............................. 340/539.1; 340/539.26; 340/572.1; 340/572.4; 340/572.7; 235/375; 235/384; 235/385; 235/492; 370/327; 370/392
(58) Field of Classification Search .............. 340/539.1, 340/539.26, 572.1, 572.4, 572.7; 235/375, 235/384, 385; 370/327, 392
See application file for complete search history.

(56) References Cited

U.S. PATENT DOCUMENTS

| 5,706,330 | A | 1/1998 | Bufferd et al. |
| 5,943,621 | A | 8/1999 | Ho et al. |
| 6,339,709 | B1* | 1/2002 | Gladwin et al. .......... 455/115.1 |
| 6,812,824 | B1 | 11/2004 | Goldinger et al. |
| 6,838,998 | B1 | 1/2005 | Brown et al. |
| 7,068,707 | B2 | 6/2006 | Bender et al. |
| 7,084,740 | B2 | 8/2006 | Bridgelall |
| 2008/0075083 | A1* | 3/2008 | Tremaine et al. ............ 370/392 |
| 2008/0137589 | A1* | 6/2008 | Barrett ....................... 370/327 |

* cited by examiner

*Primary Examiner*—Tai T Nguyen
(74) *Attorney, Agent, or Firm*—A & G Intellectual Property Group; William Aylor; Dusty Gwinn

(57) ABSTRACT

An intrinsically safe communication and tracking system comprising an overlapping series of intrinsically safe WIFI units wherein said WIFI units contain one or more radio cards and one or more antennae, and said system further comprises communication devices, TAGs, and a CPU unit to monitor the system. Alternatively, intrinsically safe communication and tracking system may be used peer-to-peer. The system may contain client devices at least one client device chosen from the following: tracking software, voice recording, audio recording, signal strength testers, Ethernet capability, gas detector, digital camera, thermal imaging camera, temperature sensing equipment, and text messaging. The CPU may also have additional capabilities at least one additional capability chosen from the following: ability to patch into external communication systems, housing of records, monitoring of employees as they enter or leave an area, encryption of communications, and sending a signal to a satellite. Also the intrinsically safe communication and tracking system may be used as an emergency rescue communications system comprising creating a system of overlapping mobile intrinsically safe WIFI units wherein a rescue team member adds another WIFI unit to the system as a mobile strength testing box reaches a predetermined level wherein said WIFI units contain one or more radio cards, one or more antennae, an internal power source, and tracking and communication ability said system further comprises a CPU to monitor all communications and track the rescuers, and said mobile strength testing box.

8 Claims, 3 Drawing Sheets

INTRINSICALLY SAFE COMMUNICATION AND TRACKING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The reliability and sustainability of wireless, meshed, digital networks in underground mines has been severely limited by not only the lack of technology capable of existing in such terrain, but also by the ability to be effective in a post-event atmosphere (such as in areas after a hazmat incident, or other pollution or hazardous material explosions or spills, after military events, or in underground areas such as in a mine), and also by the lack of a commercially developed device that, as required by the Mine Safety and Health Administration (MSHA), is explosion proof or intrinsically safe.

"Intrinsically safe" generally means incapable of releasing enough electrical or thermal energy under normal or abnormal conditions to cause ignition of a flammable mixture of methane or natural gas and air of the most easily ignitable composition. (See 30 CFR Part 18) "Explosion-proof enclosure" generally means an enclosure that is so constructed that it will withstand internal explosions of methane-air mixtures: (1) Without damage to or excessive distortion of its walls or cover(s), and (2) without ignition of surrounding methane-air mixtures or discharge of flame from inside to outside the enclosure. (30 CFR Part 18) A WIFI or WIFI unit is an access point or router or phone or radio or any other client device which runs on about 802.11 b/g protocol which can interface via readers and gateways to other frequencies and protocols.

The West Virginia Mine Safety Technology Task Force was developed and tasked significantly in response to the Sago Mine Disaster of January 2006. The task force focused on needed improvements in the areas of equipment, capabilities, and processes for mine emergency response. (see Mine Safety Technology Task Force Report—May 29, 2006). There are many devices currently in use which are utilized to establish network connections when deployed in strategic locations within certain non-hazard or mining environments. However, the existing wireless Local Area Network (LAN) devices can not operate without limitation in the underground mining industry or in other post-traumatic event environments or hazardous situations and are not intrinsically safe. There are significant problems with meeting the MSHA requirement of intrinsic safety.

The tragic events at the Darby, Alma, and Sago coal mines have highlighted the need for reliable communications between miners inside and outside the mine. Current wire-based communications systems may fail due to exposure fires, roof falls or explosions tearing down wires, or triggering of power failure or battery failure. On Jun. 15, 2006 the "Miner Improvement and new Emergency Response Act of 2006" was signed by the President of the United States to amend the Federal Mine Safety and Health Act of 1977. As part of the Act underground coal mine operators must provide for post-accident communication between underground and surface personnel via a wireless two-way medium within the next three years. The Act also requires adoption of an electronic tracking system for surface personnel to determine the location of any person trapped underground. Robust and reliable mine communications are critical to this standard for both mining operations and in the event of a mine emergency.

Past mining accidents have demonstrated that current communication systems are not sufficient to provide the support required to effectively handle evacuation and rescue operations. Highly reliable voice and high speed data systems will enable mining operation dispatchers and rescue personnel to have enhanced situational awareness so that timely and correct actions can be taken. Reliable communication and data systems could thus provide significant cost savings by improving mining efficiency, allowing for early identification of hazardous conditions to avoid accidents, providing immediate communications of incidents to MSHA and dispatchers, and also providing assistance to mine rescuers in saving lives.

BRIEF SUMMARY OF THE INVENTION

An embodiment of the current invention can be an intrinsically safe communication and tracking system with a series of intrinsically safe WIFI units and communication and tracking devices with overlapping coverage such as a checkerboard mesh or peer-to-peer non-overlappping coverage and a Central Processing Unit (CPU) to monitor the entire system.

A further embodiment of the present invention is the ability to add other client devices desired to communicate with the system such as gas detectors, digital cameras, thermal imaging cameras, temperature sensing equipment, or text messaging capabilities.

Another embodiment of the invention can be the intrinsically safe or non-intrinsically safe WIFIs kept within an explosion proof enclosure according to MSHA standards. The intrinsically safe WIFIs can have one or more types of power supply, one or more antennae, a WIFI with one or more radio cards, a plurality of intrinsically safe ports, and a key switch with all circuits and systems passing MSHA standards for what is intrinsically safe.

A further embodiment of the present invention can be the ability to use multiple sources of power, both temporary and permanent, to run the intrinsically safe WIFI units.

Another embodiment of the present invention is a CPU unit to monitor the entire system and to have the capability, if so desired, to record or track any communications within the system.

The present invention also embodies communication devices used in the intrinsically safe communication and tracking system which could allow for both communication and tracking or either of these functions or separate active TAG devices for tracking to go along with the communication devices which could allow for peer-to-peer communications.

Another embodiment of the present invention includes an emergency rescue system such as an underground rescue system of either a temporary WIFI system being set up by rescue teams as they maneuver and search or sending a WIFI down a hole drilled into the area of concern for any survivors to find and use.

DETAILED DESCRIPTION OF THE INVENTION

Figure 1:
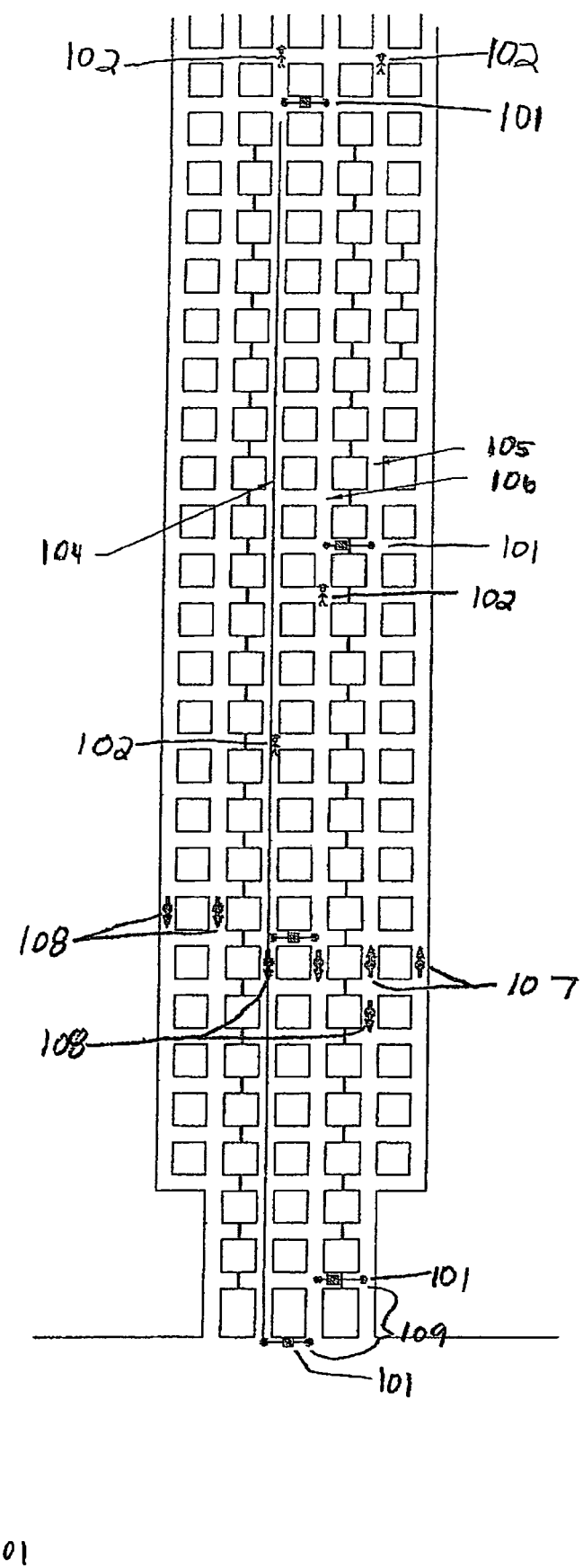
FIG. 1 is a view of the intrinsically safe communication and tracking system.
Figure 2:
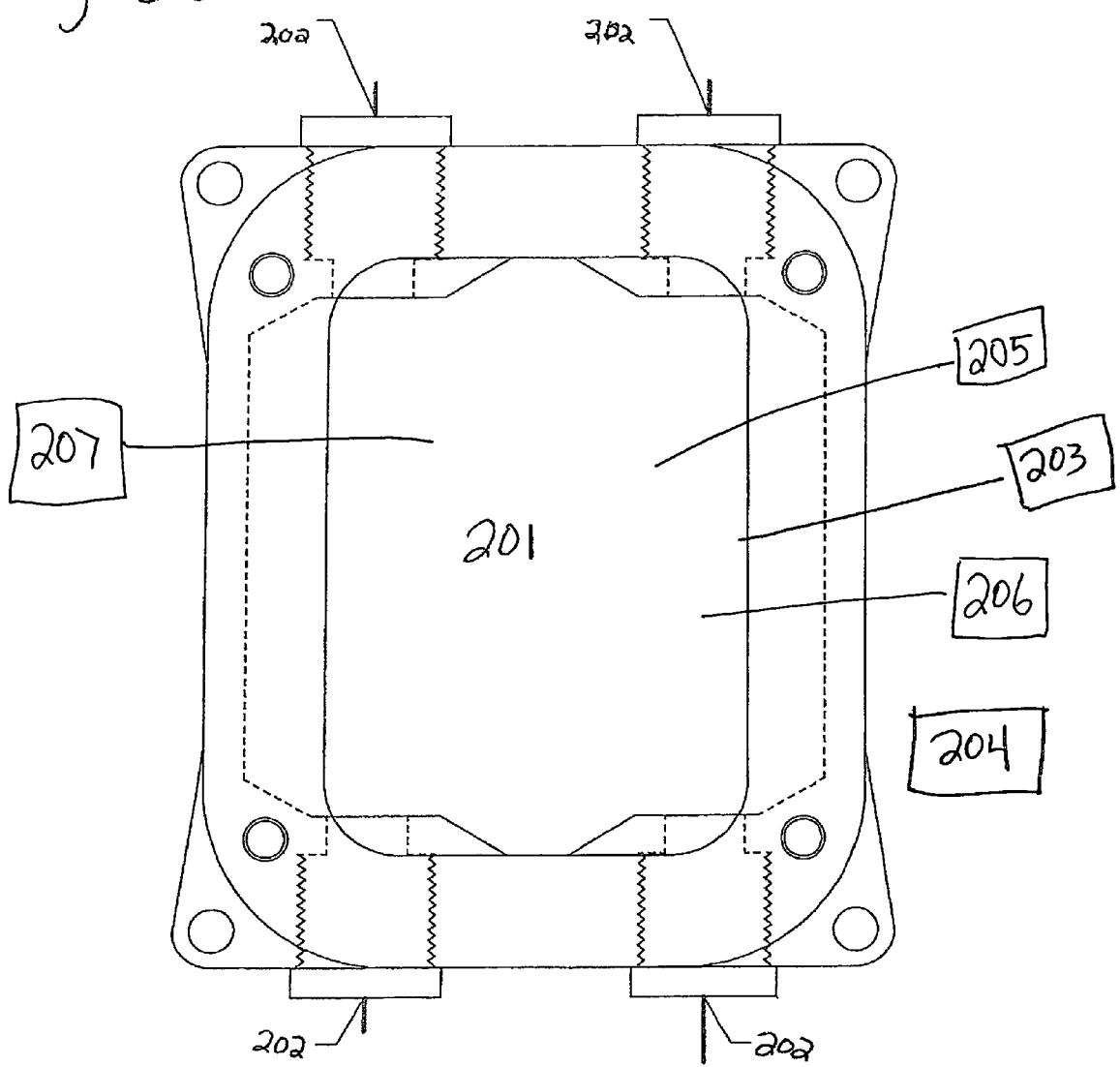
FIG. 2 is a view of the explosion proof enclosure.
Figure 3:
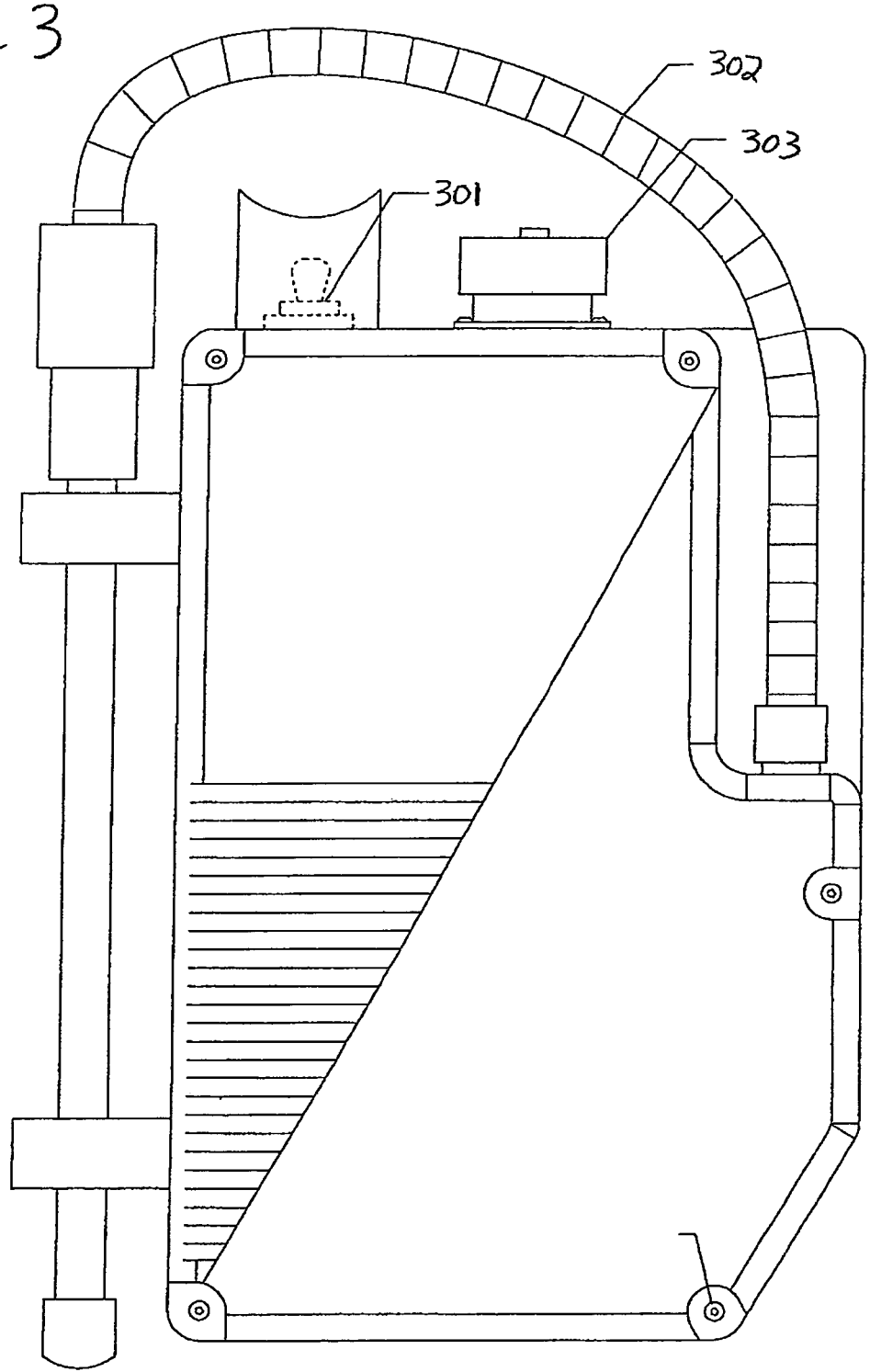
FIG. 3 is a view of an alternative embodiment of a WIFI as a mobile intrinsically safe WIFI.

The present invention can be used as an intrinsically safe communication and tracking system. The system could be utilized in situations needing intrinsically safe devices such as during hazmat, military, other pollution or hazardous material explosions or spills or in underground areas such as in a mine. The system can be embodied as a series of intrinsically safe WIFI units 101 in an overlapping configuration such as checkerboard mesh configuration backbone or a peer-to-peer configuration with both communication and tracking devices (TAG) 102 and a CPU unit 103 to monitor the entire system. The intrinsically safe WIFIs can also allow for a peer-to-peer communication systems for communication devices within the area of operation with no need for a server or gateway or switch as otherwise needed. In a mine the intrinsically safe communication and tracking system could overlap the mine belt 104, the primary escapeway 105, the secondary escapeway 106, and therefore both intake air 107 and return air 108 areas. When an overlapping configuration is utilized the units are self healing as lost units could be picked up by others in the mesh or additional units could be added 109. In addition, the communications could be encrypted should it be desired so that any communications using the WIFIs would be secretive. The intrinsically safe communication and tracking system also has a TAG 102 which has tracking abilities for the CPUs to monitor. The TAG could be placed within the peer-to-peer communication devices or it could be a separate piece of equipment. The intrinsically safe communication and tracking system also can have the ability for signal testing of any of the WIFI units within the system by any means known to one skilled within the art such as a handheld signal strength tester as a separate piece of equipment or incorporated into the communication device or TAG 102. A CPU unit 103 can coordinate the WIFIs for communications and tracking. In addition the entire WIFI system could have Ethernet capabilities. Other additions to the system could be any client devices 203 desired to communicate with the system such as gas detectors, digital cameras, thermal imaging cameras, temperature sensing equipment, or text messaging capable devices, and other types of computer, digital assistants, or sensors.

Another version of the system includes either intrinsically safe or a non-intrinsically safe WIFIs kept within an explosion proof enclosure. This explosion proof enclosure has a plurality of intrinsically safe ports 202 for one or more antennae, for Ethernet if desired, and for the entrance of an intrinsically safe external power supply 204. The antennae could be any antennae known to one skilled in the art such as various shaped WIFI antenna because a detachable connection allows for various antennas to be employed. The external power supply could be run through a t-connector so that more than one WIFI is able to be served by a single power source. The power supply could be an A/C D/C power inverter permanently attached in the ceiling of the underground area in an explosion proof enclosure. Therefore the system can accommodate various voltage AC with 110v as a normal voltage for an intrinsically safe system. A 12v DC output is standard for one of the main, normal power feeds, housed in an explosion proof enclosure. The permanent installation can also house an intrinsically safe battery such as a lithium ion battery. Both the external and internal power supplies are attached to a WIFI with one or more radio cards 203 by intrinsically safe connectors. The internal power supply 203 also has the ability to make the intrinsically safe WIFI unit mobile as it will still have both communication and tracking function if removed from the backbone location until the internal power supply has run out. Even as the internal power supply is ending the original or a new external power supply could be added to the intrinsically safe WIFI. The connectors could be any known by one skilled in the art such as by a threaded or staplelock connector. The intrinsically safe WIFIs also have a key switch which is turned on only when the WIFI unit is installed in the intrinsically safe communication and tracking system so that the internal power supply is not taxed before it is needed. Both the explosion proof enclosure and the WIFI could also have additional features such as Ethernet capabilities and tamper-resistant enclosures. The Ethernet capabilities could be included by the addition of a daughter card 203 to the case and a port placed on the outside of the enclosure. Case sealing can be utilized to keep the intrinsically safe WIFI units from tampering until needed and to keep out dust or debris or other foreign substance. The case could be closed by many methods known to one skilled in the art such as by a restraining device, a seal, or a lock such as a tumbler lock. Additionally, the intrinsically safe WIFI unit could have the capability of alerting the CPU unit should there be an instance when the explosion proof enclosure is opened.

In some more advanced embodiments of the system the CPU also patches in to allow exchange between the intrinsically safe communication area to any needed communication devices such as those within an ambulance or with the police, or any emergency response team in transit and have the ability to record all communications taking place through the CPU. In addition the CPU could house needed records such as medical records for employees. The CPU could monitor employees as they enter or leave the area for an accurate assessment of the number and identity and location of employees within the intrinsically safe communications area at any time. The CPU could also have the capability of sending a signal to a satellite to send records to another party not at the communications and tracking site.

The signal testing could be by any conventional means as long as it is able to be read by both the CPU and the signal testing unit itself. The signal testing could be within either the communication device or the TAG or could be a separate piece of equipment. The signal testing will enable the person within the intrinsically safe communications and tracking area to look at the equipment to make sure that a usable signal is currently available. If there is not a usable signal that person could then either leave that area and go to where a signal is available or add another WIFI unit to the intrinsically safe communications and tracking area to create a larger area of available signal.

The communication devices used in the intrinsically safe communication and tracking system could allow for both communication and tracking or either of these functions. The communication devices could be adapted for either communication alone or in combination with tracking features which would create a communication device and TAG combination or a device dedicated for communications only. The communications could also be simplified by adapting a communication device that is attached to a belt or other attachment means and can be used peer-to-peer in a hands free manner. This could also eliminate the need for removing gloves for dialing, etc. as the commination can be used without the large menu many current phones and communication devices have. However, the communication device could be a standard conventional phone as well if desired by the user.

The TAG could be placed within the communication devices or be a separate device. This device could be attached to a belt or other attachment means. The TAG would have the function of allowing someone at the CPU to monitor that location of anyone wearing a TAG. In addition, the TAG could be used as a punch clock to allow the manager to know when an employee entered the area and when that employee has left the area.

The intrinsically safe communication and tracking system could also be embodied as emergency rescue system such as an underground rescue system. In addition to utilizing a pre-existing backbone of intrinsically safe WIFI units, the rescue system could be created and modified as necessary as the intrinsically safe WIFI units are introduced and continually added to the search area to create an area of communication and tracking. The unit could be adapted to have an on/off switch 301 to prevent the loss of power, an internal power source, one or more antenna 302, Ethernet connections 303, and the ability to connect to a permanent power source. The unit could also be adapted for temporary hanging in the area of search and either the normal intrinsically safe WIFI unit could be used or a more mobile unit with no permanent power source could be utilized. The unit would have one or more radio cards within either the intrinsically safe unit or the non-intrinsically safe unit housed in the explosion proof enclosure. The rescue system would have tracking and communication devices working through the mobile WIFI units. In addition a CPU would monitor all communications and track the rescuers. The rescue system would also include a mobile signal testing box to read the signal strength of the WIFI units to let a rescue team know when to add another mobile unit to the area. The addition would take place at a predetermined level of strength of signal so that a rescue member would not extend the search beyond communication and tracking capability.

A separate underground rescue system could be used for areas after an explosion or collapse where the underground communication and tracking system has been used. In these areas a WIFI with one or more radio cards, an internal power source, and one or more antennae could be sent underground through a tube drilled through the area to any location where it is believed a person could be located. That person can then access the WIFI to allow rescuers to identify their location.

These terms and specifications, including the examples, serve to describe the invention by example and not to limit the invention. It is expected that others will perceive differences, which, while differing from the forgoing, do not depart from the scope of the invention herein described and claimed. In particular, any of the function elements described herein may be replaced by any other known element having an equivalent function.

What is claimed is:

1. An intrinsically safe communication and tracking system for the use of a miner comprising:
    a TAG module being worn by a user, wherein the TAG transmits a location signal;
    an overlapping series of intrinsically safe WIFI units able to track the location and movement of a TAG, wherein each WIFI unit is housed in an explosion proof enclosure and containing one or more radio cards wherein the radio cards can transmit and receive data for peer-to-peer communication with other WIFI units and to a remote location and an intrinsically safe external power supply running though the enclosure one or more client devices at least one client device chosen from a gas detector, a digital camera, a thermal imaging device, and a temperature sensor to transmit a hazard signal in response to a hazard condition detected from the gas detector, digital camera, thermal imaging device, or temperature sensor; and
    a monitoring unit, located at the remote location, for receiving hazard signals, communications from radio cards, and location signals transmitted from the TAG or the WIFI unit, wherein the monitoring unit is able to patch into an external communication system after the notification from a user WIFI communication or the loss of a TAG signal wherein the monitoring unit is able to patch into an external communication system after the indication of a hazard condition change detected from a client device.

2. The intrinsically safe communication and tracking system of claim 1 further comprising a daughter card within the enclosure.

3. The intrinsically safe communication and tracking system of claim 1 further comprising case sealing for the enclosure.

4. The intrinsically safe communication and tracking system of claim 1 further comprising a key switch on the explosion proof enclosure.

5. The intrinsically safe communication and tracking system of claim 1 further comprising an intrinsically safe internal power supply for the WIFI housed within the enclosure.

6. The intrinsically safe communication and tracking system of claim 1 further comprising running the intrinsically safe external power supply through a t-connector to one or more enclosures.

7. The intrinsically safe communication and tracking system of claim 1 wherein the WIFI units are further comprised of one or more antennae to amplify the data signal of the radio cards.

8. A mine emergency rescue communication system comprising:
    a communication device and TAG module being worn by a user, wherein the TAG transmits a location signal;
    an overlapping series of intrinsically safe WIFI units, wherein each WIFI unit is housed in an explosion proof enclosure and containing one or more radio cards for peer-to-peer communication with other WIFI units and to a remote location wherein the WIFI contains one or more antennae to amplify the communication signal to and from the WIFI and remote locations;
    an intrinsically safe external power supply running through the enclosure and an intrinsically safe internal power supply located within the enclosure;
    one or more client devices at least one client device chosen from a gas detector, a digital camera, a thermal imaging device, and a temperature sensor to transmit a hazard signal in response to a hazard condition detected from the gas detector, digital camera, thermal imaging device, or temperature sensor;
    a monitoring unit, located at a remote location, for receiving hazard and location signals transmitted from the WIFI units and communication devices, wherein the monitoring unit is able to patch into an external communication system to indicate a hazard condition and location of a WIFI or incident, communication from a WIFI, or loss of a TAG signal; and
    an emergency team able to add WIFI units to the series of WIFI units to create an area of communication and tracking to pinpoint the location of a user after a hazard.

* * * * *